United States Patent Office 2,976,241
Patented Mar. 21, 1961

2,976,241
LUBRICATING GREASE COMPOSITIONS CONTAINING NOVEL SOAP-SALT COMPLEXES

Arnold J. Morway, Clark, and Alfred H. Matuszak, Westfield, N.J., assignors to Esso Research and Engineering Company, a corporation of Delaware No Drawing. Filed June 30, 1955, Ser. No. 519,280

7 Claims. (Cl. 252—33.6)

The present invention relates to high temperature lubricating grease compositions and particularly to lubricating greases of the type which comprise lubricating oil thickened to grease consistency with soap-salt complexes. The invention also relates to novel soap-salt complexes and to their method of preparation.

In brief, the invention pertains to compositions consisting of or containing dehydrated complexes consisting of a metal salt of acetic acid, a metal salt of the hydrolyzation product of a lactam and a metal soap of a high molecular weight monocarboxylic acid containing from about 12 to 30 carbon atoms per molecule. The compositions of the invention include novel and improved lubricating greases, lubricating oils, gear oils, filter oils, etc. In particular, grease compositions containing the soap-salt complexes of the invention have been found to have excellent high temperature as well as other desirable grease characteristics.

The use of soap-salt complexes as grease thickeners is well known in the art. The complexes used heretofore consisted of combinations of metal soaps of high molecular weight carboxylic acids and metal salts of low molecular weight carboxylic acids. The commonly known grease-making, high molecular weight fatty acids such as stearic acid, oleic acid, etc. have been employed in conjunction with such low molecular weight carboxylic acids as acetic, propionic and the like to form the metallo-organic complex grease thickeners of the prior art. Recently it has been suggested that complexes can be prepared from a low molecular weight carboxylic acid such as acetic acid, a medium molecular weight carboxylic acid having from about 3 to 10 carbon atoms per molecule and a high molecular weight carboxylic acid having from about 12 to 30 carbon atoms per molecule.

It has now been found that the acidic hydrolyzation products of lactams having the general formula

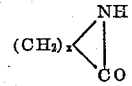

wherein $x$ is an integer from 3 to 5, can be employed with acetic acid and a high molecular weight carboxylic acid having from about 12 to 30 carbon atoms per molecule to prepare soap-salt complexes. The lactams may be used directly in the manufacture of the novel complexes or grease compositions containing the same; hydrolyzation of the lactam occurring during the preparation of the complex. The general hydrolyzation reaction is represented by the following using caprolactam as an example:

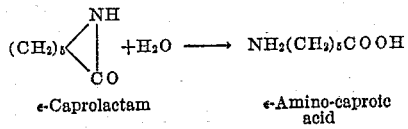

ε-Caprolactam      ε-Amino-caproic acid

Other lactams contemplated in this invention include 2-pyrrolidone and 2-piperidone, which upon hydrolysis yield γ-amino-butyric acid and δ-amino-valeric acid, respectively. Lactams are cyclic amides formed by the elimination of water between a carboxyl group and an amino group in the same molecule. The resulting ring-system is covalently linked, and the ease of its formation is determined by the number of atoms separating the reacting groups. Thus, for example, with compounds such as glycine and β-amino-propionic acid, wherein the reacting amino and carboxyl groups are separated by one and two carbon atoms, respectively, no lactam formation will occur. On the other hand, where the reacting groups are separated by from 3 to 5 carbon atoms lactam formation will take place. Amino acids with more than 5 carbon atoms separating the amino and carboxyl groups yield only high molecular weight polymeric amides. For a detailed description of lactams see "Sidgwick's Organic Chemistry of Nitrogen" by Taylor and Baker, page 148, Oxford University Press (1937), and "Organic Chemistry" by Whitmore, page 504, D. Van Nostrand Co., Inc., (1951 edition).

High molecular weight monocarboxylic acids containing from about 12 to 30, preferably from about 18 to 22, carbon atoms per molecule are useful for the purposes of this invention. These acids may be derived from saturated or unsaturated naturally occurring or synthetic fatty material. The fatty acids normally used in the manufacture of conventional greases, particularly the more saturated acids, are preferred. Examples of such acids include lauric, myristic, palmitic, stearic, mono- and polyhydroxy stearic, and arachidic acids as well as hydrogenated fish oil and tallow acids, which comprise acids corresponding to commercial stearic acid in degree of saturation. However, unsaturated fatty acids such as oleic, ricinoleic and similar acids may also be used.

The acetic acid employed in the present invention can be either glacial acetic acid or an aqueous solution of acetic acid. The concentration of the acetic acid in the aqueous solution may vary from about 60 to 100 wt. percent, and preferably about 80 to 100 wt. percent. The presence of a salt of acetic acid in the soap-salt complex is an essential element of the present invention, but the use of a substituted acetic acid having two carbon atoms per molecule is not excluded, where such modification may be desirable. For example, chloro-acetic acid, glycolic acid, thioglycolic acid, glycine or oxalic acid may be used to modify the structure of greases made in accordance with this invention.

The metal component of the complexes of the invention is employed in a form which can combine chemically with carboxylic acids to form salts or soaps. Ordinarily, the metal hydroxide is used. The choice of metal component depends to a certain extent on the use to which the multiple salt and soap complex of the invention is to be put. In general, the alkaline earth metals: calcium, barium, magnesium and strontium; and the alkali metals: sodium, potassium and lithium are employed in the form of hydroxides or carbonates. Calcium hydroxide and sodium hydroxide are especially preferred. When greases having a high resistance to water washing are desired alkaline earth metals are utilized, since the alkali metals, e.g. sodium, tend to impart a low resistance to water washing to the final grease composition. In addition to the metals previously mentioned, zinc can also be employed in the preparation of the complexes of this invention.

In general, in the complexes of the invention the mol ratio of acetic acid radicals to the radicals of the other acids (the amino-carboxylic acid, i.e. the acidic product derived from the hydrolyzation of the lactams described above, and the high molecular weight monocarboxylic acid, e.g. stearic acid) is within the range of about 0.5:1 to 20:1, preferably from about 0.6:1 to 6:1. When alkali metals are employed the mol ratio should be about 0.5:1 to 2:1. The mol ratio of the amino-carboxylic acid radical to the high molecular weight monocarboxylic acid radical will be from about 1:1 to 10:1, preferably from about 2:1 to 5:1.

In accordance with one feature of the present invention, the soap-salt complexes described above may be incorporated in a wide variety of liquid and semi-liquid materials of natural or synthetic origin. In one particular embodiment, these high metal content complexes are incorporated in mineral and/or synthetic lubricating oils in grease-making proportions of from about 5 to 40 wt. percent, preferably from about 10 to 30 wt. percent, to produce greases having excellent high temperature properties as well as other desirable grease characteristics. In general, the mineral or synthetic lubricating oil should have a viscosity within the range of about 50 to 2000 S.U.S. at 100° F. and about 30 to 150 S.U.S. at 210° F., an ASTM pour point of about +20 to −75° F., a flash point of about 350° to 650° F., and a viscosity index of about 0 to 60, although lubricating oils having a viscosity index of 100 or higher can also be employed. As mentioned above, synthetic as well as mineral lubricating oils can be employed as part or all of the liquid phase of the grease. Synthetic lubricating oils of the hydrocarbon, hydrocarbon polymer, diester, complex ester, formal, mercaptal polyalkylene oxide, silicone and similar types can be effectively utilized. Some of the preferred synthetic lubricating oils include di-2-ethylhexyl sebacate, di-$C_8$ Oxo azelate and complex esters prepared from glycols, dicarboxylic acids and monohydric alcohols and/or monocarboxylic acids.

The soap-salt complexes of the invention may also be added in relatively small proportions of about 2 to 4 wt. percent as bodying agents to paints; as dispersants and corrosion inhibiting additives to residual fuels; as detergent additives to mineral or synthetic automotive lubricants; as extreme pressure and metal bonding additives to metal working and engine lubricants; etc.

The metal soap-salt complexes of the invention may be prepared by coneutralization of a mixture of the acetic acid, the amino-carboxylic acid and the high molecular weight carboxylic acid with suitable bases. In this method the lactam is hydrolyzed to the amino-carboxylic acid by heating with the acetic acid at a temperature of from about 110° to 130° F., the high molecular weight carboxylic acid is added, and the resulting mixture of acids is then coneutralized and heated to a complex forming temperature of about about 400° F., preferably from about 450° to 550° F. The coneutralization step may be carried out in situ in the liquid menstrum to which the soap-salt complex is to be applied in actual use. For example, the mixed acids may be coneutralized in a portion or all of the lubricating oil which then forms the dispersant of the soap-salt complex and is thereby gelled to a grease.

In lieu of the coneutralization method of preparation, the soap-salt complexes of the invention may be prepared by separately preforming at least a portion of the acetic acid salt, the amino-carboxylic acid salt and the high molecular weight carboxylic acid soap, intimately mixing the preformed materials and heating the resulting mixture under complex forming conditions. When this method of preparation is employed the lactam is separately hydrolyzed by the metal hydroxide to give the corresponding aliphatic amino-carboxylic acid metal salt.

In general, lubricating grease compositions thickened with the soap-salt complexes of the invention are prepared by intimately mixing together and desired amount of mineral and/or synthetic lubricating oil and the lime. The lactam monomer is added to the resulting slurry, followed by heating to a temperature of about 125° to 175° F. with stirring for about 1 to 3 hours. The high molecular weight monocarboxylic acid and then the acetic acid are added to the mixture, and heating is continued to a temperature of from about 450° to 550° F. over a period of from about 1 to 3 hours. The heating is then discontinued and the grease batch is cooled to room temperature. When the grease is at a temperature of about 200° F. conventional additives such as oxidation inhibitors like phenyl alphanaphthylamine can be added. If desired, the resulting grease is then homogenized in a Gaulin homogenizer, Morehouse mill, etc. at high rates of shear within the range of about 10,000 to 500,000 reciprocal seconds.

The grease compositions may also be prepared by charging an aqueous solution of acetic acid, a portion or all of the lubricating oil and the lactam to a fire heated kettle with stirring. The mixture is heated to a temperature of from about 100° to 150° F. for about 2 to 5 hours. The high molecular weight monocarboxylic acid followed by a smooth slurry of the lime in the balance of the lubricating oil, if only a portion of the lubricating oil was previously employed, are then added. The resulting mixture is then heated to a temperature of from about 450° to 550° F. with stirring. The heating is then discontinued, and the grease batch is cooled. The grease can be finished as described in the preceding paragraph, if desired.

The soap-salt complexes of the invention when prepared in a liquid dispersant or solvent may be isolated from their dispersion or solutions by solvent extraction of the dispersing medium in a solvent in which the complexes are insoluble. Suitable solvents include most of the hydrocarbon solvents, e.g. hexane, naphtha, etc., as well as oxygen-containing solvents such as acetone; the proper choice depending on the solubility characteristics of the liquid menstruum used to disperse the complexes. For example, the grease of Example I below can be extracted with several volumes of heptane in successive portions, which remove the lubricating oil, and on volatilizing the residual heptane the isolated complex is obtained as a soft solid.

The invention will be more fully understood by reference to the following specific examples illustrating various modifications of the invention.

Example I

A lubricating grease composition according to this invention was prepared from the following constituents:

| Formulation | Percent Weight |
| --- | --- |
| Glacial acetic acid | 12.0 |
| ε-Caprolactam monomer | 4.0 |
| Stearic acid | 2.0 |
| Hydrated lime | 10.0 |
| Phenyl alpha-naphthylamine | 0.5 |
| Mineral lubricating oil (55 SUS/210° F.) | 71.5 |
| Mol ratio (acetic/other acids) | 5.4 |

*Preparation.*—The mineral lubricating oil and the hydrated lime were charged to a fire heated kettle and mixed intimately to a fine, smooth slurry. The ε-caprolactam was then added, and the resulting mixture heated at a temperature of about 150° F. For 2 hours. The stearic acid, followed by the acetic acid, were then added, and heating was continued to a temperature of about 500° F. over a period of two hours. The grease batch was then cooled to a temperature of about 200° F. with stirring, and the phenyl alpha-naphthylamine added. The grease batch was further cooled to room temperature and then finished by being passed through a Gaulin homogenizer at 5000 p.s.i.

| Properties | |
|---|---|
| Appearance | Excellent, smooth, uniform grease. |
| Free Alkalinity (as percent NaOH) | 1.05. |
| Dropping Point, °F | 500+. |
| Penetrations (77° F. mm./10): | |
| Unworked | 310. |
| Worked 60 strokes | 340. |
| Worked 100,000 strokes | 345 (110° F.). |
| Norma-Hoffmann Oxidation test (hrs. to 5 p.s.i. drop) | 400+. |
| Lubricating Life, hrs. (10,000 r.p.m.—250° F.) | 1000+. |
| Water Washing Test (Percent Loss) | 5.0. |
| Solubility in boiling water | Nil. |
| Extreme Pressure Properties—Almen Test: | |
| Weights Carried— | |
| Gradual Loading | 15. |
| Shock Loading | 15. |
| Shell 4 Ball Test: E. P. Value (Mean Hertz Load) | 52.1. |
| 4 Ball Wear Test: (1800 r.p.m.—10 kg. load, 75° C., 1 hr.) Scar diameter (mm.) | 0.27. |

Example II

A grease composition having the same formulation as the grease of Example I, except that an aqueous solution of 60% of acetic acid was employed in the place of the glacial acetic acid, was prepared as follows:

*Preparation.*—The acetic acid, one half of the mineral lubricating oil and the ε-caprolactam were charged to a fire-heated kettle with stirring. The resulting mixture was heated to a temperature of about 120° F. and held at this temperature for about three hours. The stearic acid, followed by a smooth slurry of the lime in the balance of the mineral lubricating oil, was then added. The resulting grease batch was heated to a temperature of about 500° F. Heating was then discontinued, the grease cooled to about 200° F., the phenyl alpha-naphthylamine added, and then cooled to room temperature. The resulting grease composition was finished by being passed through a Gaulin homogenizer at 5000 p.s.i.

| Properties | |
|---|---|
| Appearance | Excellent, smooth, uniform grease. |
| Free alkalinity (as percent NaOH) | 0.95. |
| Dropping Point, °F | 500+. |
| Penetrations (77° F. mm./10): | |
| Unworked | 300. |
| Worked 60 strokes | 310. |
| Worked 100,000 strokes | 350. |
| Solubility in boiling water | Nil. |
| Extreme Pressure Properties—Almen Test: | |
| Weights Carried— | |
| Gradual Loading | 15 Pin Condition: Excellent. |
| Shock Loading | Do. |
| Shell 4 Ball E. P. Test: E. P. Value (Mean Hertz Load) | 55.6. |
| 4 Ball Wear Test: (1,800 r.p.m.—10 kg. Load, 75° C., 1 hr.) Scar Diameter (mm.) | 0.25. |

Example III

A lubricating grease composition according to this invention was prepared from the following constituents:

| Formulation | Percent Weight |
|---|---|
| Glacial acetic acid | 4.0 |
| ε-Caprolactam | 10.0 |
| Hydrofol Acid 51* | 10.0 |
| Sodium hydroxide | 6.2 |
| Phenyl alpha-naphthylamine | 0.5 |
| Mineral lubricating oil (55 SUS/210° F.) | 69.3 |
| | |
| Mol ratio (acetic acid/other acids) | 0.6 |

*Hydrogenated fish oils corresponding to commercial stearic acid in degree of saturation.

*Preparation.*—The ε-caprolactam, the sodium hydroxide as a 20% aqueous solution and the mineral lubricating oil were charged to a fire heated kettle. The mixture was heated with stirring to a temperature of about 175° F. The mixture was heated at this temperature for about two hours. The Hydrofol acid 51 and acetic acid were then added, and heating was continued to a temperature of about 500° F. Heating was then discontinued, the grease cooled to about 200° F., and phenyl alpha-naphthylamine added with stirring. The grease was then cooled to room temperature and finished by being passed through a Gaulin homogenizer at 5000 p.s.i.

| Properties | |
|---|---|
| Appearance | Excellent, smooth, short-fiber grease. |
| Dropping Point, °F | 500+. |
| Penetration (77° F. mm./10): | |
| Unworked | 275. |
| Worked 60 strokes | 290. |
| Worked 100,000 strokes | 340. |
| Solubility in cold water | None. |
| Water Washing Test (Percent Loss) | 50%. |
| Norma-Hoffmann Oxidation Test (hrs. to 5 p.s.i. drop) | 365. |

In summation, the present invention involves novel and improved metal soap-salt complexes prepared from acetic acid, high molecular weight monocarboxylic acids having from about 12 to 30 carbon atoms per molecule, and a lactam or its acidic hydrolyzation product, i.e. an aliphatic amino-carboxylic acid. Lubricating grease compositions prepared in accordance with the invention contain from about 60 to 95 wt. percent of a lubricating oil and from about 5 to 40 wt. percent of the soap-salt complex. The preferred grease compositions containing from about 10 to 30 wt. percent of the soap-salt complex, which is prepared with from about 2 to 15, preferably about 4 to 12, wt. percent of the acetic acid, from about 2 to 12, preferably about 4 to 10, wt. percent of the lactam or the amino-carboxylic acid derived therefrom, and from about 1 to 12, preferably about 2 to 10, wt. percent of high molecular weight monocarboxylic acid. The amount of metal base employed will ordinarily be within the range of about 5 to 15 wt. percent. All of the above weight percentages are based on the total weight of the grease composition.

The invention is not limited to the specific materials and conditions of the foregoing examples. These materials and conditions may be varied within the limits indicated in the general portions of the specification. Furthermore, the lubricating compositions prepared in accordance with the invention may also contain conventional modifiers or additives such as oxidation inhibitors, metal deactivators, corrosion inhibitors, extreme pressure agents, tackiness or stringiness agents, etc., as will be well understood by those skilled in the art.

What is claimed is:

1. A lubricating grease composition comprising a major proportion of a lubricating oil thickened to grease consistency with a soap-salt complex, said complex being prepared at a temperature of about 450° to 550° F. and consisting essentially of a metal salt of acetic acid, a metal salt of an amino-carboxylic acid having the formula $$NH_2(CH_2)_xCOOH$$

wherein $x$ is an integer from 3 to 5, and a metal soap of a high molecular weight carboxylic acid having from about 12 to 30 carbon atoms per molecule, the mol ratio of amino-carboxylic acid to high molecular weight acid being about 1:1 to 10:1, the mol ratio of acetic acid to both the amino-carboxylic acid and the high molecular weight carboxylic acid being about 0.5:1 to 20:1, and the metal constituent of said salts and soap being selected from the group consisting of alkaline earth metals, alkali metals and zinc.

2. A lubricating grease according to claim 1, wherein said metal is calcium.

3. A lubricating grease composition comprising a major proportion of a mineral lubricating oil thickened to grease consistency with 5 to 40 wt. percent of a metal soap-salt complex prepared by heating to a temperature of about 450° to 550° F., metal base, about 2 to 15 wt. percent of acetic acid, about 4 to 10 wt. percent of an amino-carboxylic acid having the general formula $$NH_2(CH_2)_xCOOH$$

wherein $x$ is an integer from 3 to 5, and from about 1 to 12 wt. percent of a high molecular weight carboxylic acid having from about 12 to 30 carbon atoms per molecule, said metal being an alkaline earth metal, said weight percentages being based on the total weight of said lubricating grease composition, and wherein the molar ratio of said amino-carboxylic acid to said high molecular weight carboxylic acid is about 1:1 to 10:1.

4. The method of preparing a lubricating grease composition which comprises dispersing a metal base and a lactam having the general formula

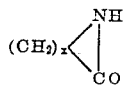

wherein $x$ is an integer from 3 to 5, in a lubricating oil, heating said dispersion to a temperature of about 125° to 175° F., adding a high molecular weight carboxylic acid having from about 12 to 30 carbon atoms per molecule and acetic acid to said heated dispersion, and then heating the resulting mixture to a complex-forming temperature within the range of about 450° to about 550° F., the metal constituent of said metal base being selected from the group consisting of alkaline earth metals, alkali metals and zinc, and wherein the mol ratio of said lactam to said high molecular weight carboxylic acid is about 1:1 to 10:1.

5. The method of claim 4 wherein said lactam is $\epsilon$-caprolactam.

6. The method of claim 4 wherein the resulting grease composition is homogenized.

7. The method of preparing a lubricating grease composition which comprises dispersing acetic acid and a lactam having the general formula

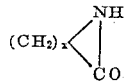

wherein $x$ is an integer from 3 to 5, in a mineral lubricating oil slurry containing a hydrated alkaline earth metal base, heating the dispersion to a temperature of from about 100° to 150° F., adding a high molecular weight carboxylic acid having from about 12 to 30 carbon atoms per molecule and acetic acid to said reaction mixture, and heating the resulting mixture to a temperature of from about 450° to 550° F., wherein the mol ratio of said lactam to said high molecular weight carboxylic acid is about 1:1 to 10:1.

References Cited in the file of this patent

UNITED STATES PATENTS

| | | |
|---|---|---|
| 2,417,428 | McLennan | Mar. 18, 1947 |
| 2,614,076 | Moore et al. | Oct. 14, 1952 |
| 2,614,077 | Moore et al. | Oct. 14, 1952 |
| 2,695,910 | Asseff et al. | Nov. 30, 1954 |
| 2,753,364 | Boner et al. | July 3, 1956 |
| 2,766,267 | Hill | Oct. 9, 1956 |
| 2,846,392 | Morway et al. | Aug. 5, 1958 |
| 2,852,466 | Hotten | Sept. 16, 1958 |